United States Patent [19]
Goodman

[11] Patent Number: 6,095,267
[45] Date of Patent: Aug. 1, 2000

[54] PERSONAL TRANSPORTATION APPARATUS

[76] Inventor: Paul F. Goodman, 1150 Bower Hill Rd., Apt. 504-B, Pittsburgh, Pa. 15243

[21] Appl. No.: 08/958,249

[22] Filed: Oct. 27, 1997

[51] Int. Cl.⁷ ..................................................... B92D 11/00
[52] U.S. Cl. ............................................................. 180/6.5
[58] Field of Search ....................... 180/6.5, 24.06–24.08, 180/21, 23, 24, 24.03; 297/DIG. 4; 280/81.5, 93

[56] References Cited

U.S. PATENT DOCUMENTS

| | | | |
|---|---|---|---|
| 5,350,033 | 9/1994 | Kraft | 180/167 |
| 5,657,828 | 8/1997 | Nagamachi | 180/19.3 |

Primary Examiner—Chris Schwartz
Assistant Examiner—C. T. Bartz
Attorney, Agent, or Firm—J. Stewart Brams

[57] ABSTRACT

A powered, personal transportation apparatus for transporting an individual in a standing position, the apparatus including a platform supported by wheels, on which the user stands, the platform having a circular profile which defines substantially the entire outer periphery thereof, and some of the wheels of the apparatus being powered for driving the apparatus in translation and turning, the apparatus being configured such that it is able to turn completely around within its own profile whereby it is easily maneuverable in confining spaces.

8 Claims, 2 Drawing Sheets

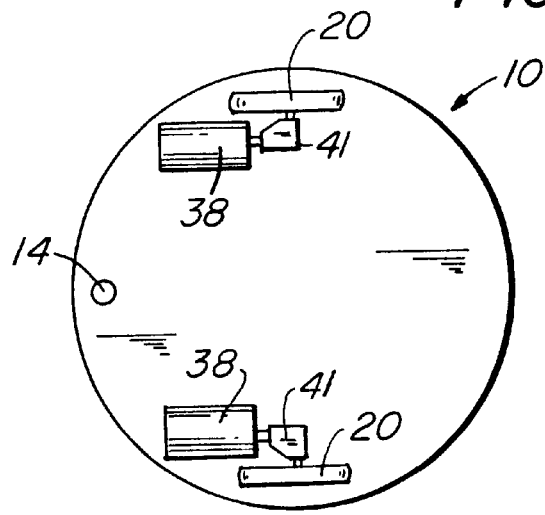
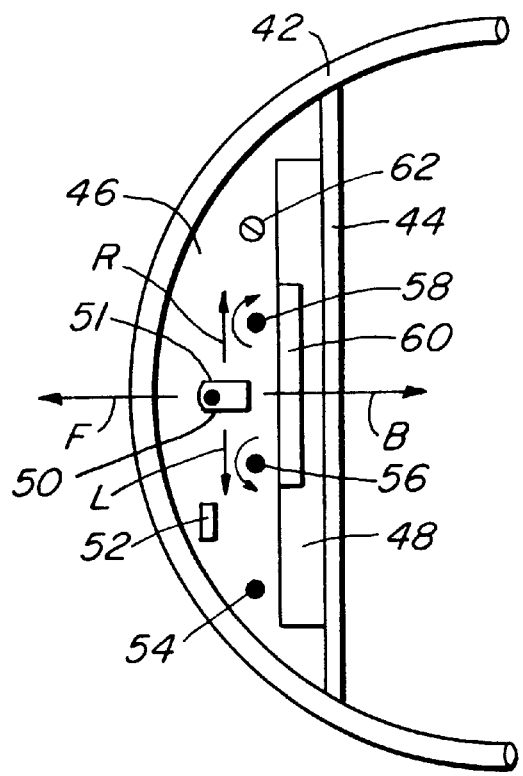

PERSONAL TRANSPORTATION APPARATUS

BACKGROUND OF THE INVENTION

In the art of personal transportation there are known a wide variety of apparatus. For example, a variety of wheeled apparatus, both powered and manually operated, are known for transporting a person who cannot walk. These include a variety of powered cart and wheelchair designs. Other personal transport apparatus is known for transporting able bodied persons whose jobs require them to cover large areas, for example agents and others working in large airports. Similarly, industrial environments often require personal transport apparatus for the use of workers in large plants, order pickers in large warehouses, and the like.

The following documents characterize the prior art. U.S. Pat. No. 4,475,611 discloses a scaffold power system which includes a pair of powered drive wheels. U.S. Pat. No. 4,221,273 discloses a motor driven undercarriage with corner wheels and a pair of powered drive wheels. U.S. Pat. No. 4,874,055 discloses a standup personal transport apparatus in the nature of a motorized golf cart. Other transportation devices are disclosed in U.S. Pat. Nos. 4,128,137, 5,445,233, 5,435,404, 4,513,832 and 4,807,712.

The present invention contemplates a novel and improved personal transportation apparatus for carrying a user in a standing position. The apparatus provides safety and stability through a low center of gravity, which in addition permits the apparatus to be mounted with only a small step up from floor level. These features are advantageous for both able bodied users and those with walking disabilities.

The apparatus contemplates a circular platform supported on wheels comprised of a plurality of non-powered castering wheels and a pair of independently powered drive wheels. An upstanding control console provides a handle bar structure to be grasped by the user, as well a control panel with controls for moving the apparatus by actuating the power driven wheels in various modes to achieve forward or reverse translation, forward or reverse left or right turning translation, or stationary rotating movement, that is rotational movement without translation. Powered operation of the apparatus is controlled by a control system including a joy stick for actuating the apparatus in all modes of movement except rotation without translation. For this latter mode of operation, separate controls are provided for left and right turning, respectively.

It is therefore one object of the invention to provide a novel and improved personal transportation apparatus.

A further object of the invention is to provide a personal transportation apparatus which is capable of turning around completely within its own profile and is therefore able to turn around in any space it occupies.

A further object of the invention is to provide a personal transportation apparatus of improved stability and safety for the user.

These and other objects and further advantages of the invention will be more readily appreciated upon consideration of the following detailed description and the accompanying drawings, in which:

FIG. 3 is a generally schematic illustration of an alternative embodiment for the platform of the apparatus of FIG. 1; and FIG. 4 is a top plan view of the apparatus control console taken on lines IV—IV of FIG. 1.

Figure 1:
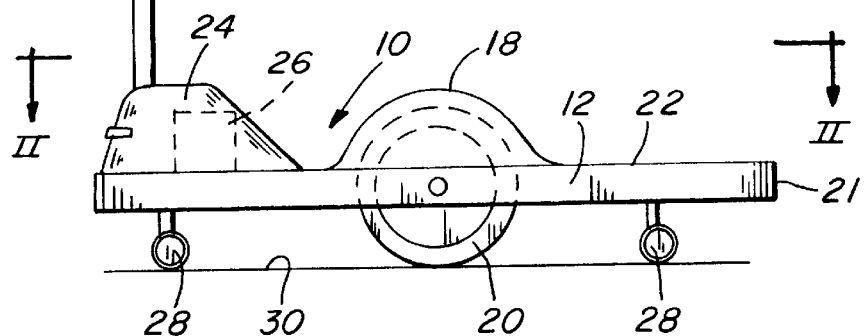
FIG. 1 is a side elevation of an apparatus according to one presently preferred embodiment of the instant invention.

There is generally indicated at 10 in FIG. 1 a personal transportation apparatus according to one presently preferred embodiment of the instant invention. Apparatus 10 comprises a platform 12 of molded, fiberglass reinforced plastic for example, and an upstanding support 14, a length of hollow aluminum pipe for example, suitably fixed to platform 12 and extending upwardly therefrom. A hand grip and control console assembly 16 is fixedly mounted to the uppermost end of support 14.

Platform 12 includes an upper surface 22 which provides a user standing area, and laterally spaced, upwardly projecting fender portions 18 which enclose the portions of power driven wheels which extend above the standing area 22. Located forwardly of fender portions 18 and centrally therebetween is a housing 24 within which a storage battery, for example a conventional automotive battery 26, is enclosed. The housing 24 may encompass support 14 but is otherwise preferably to be selectively removable from its installed location on platform 12 for servicing battery 26.

Figure 2:
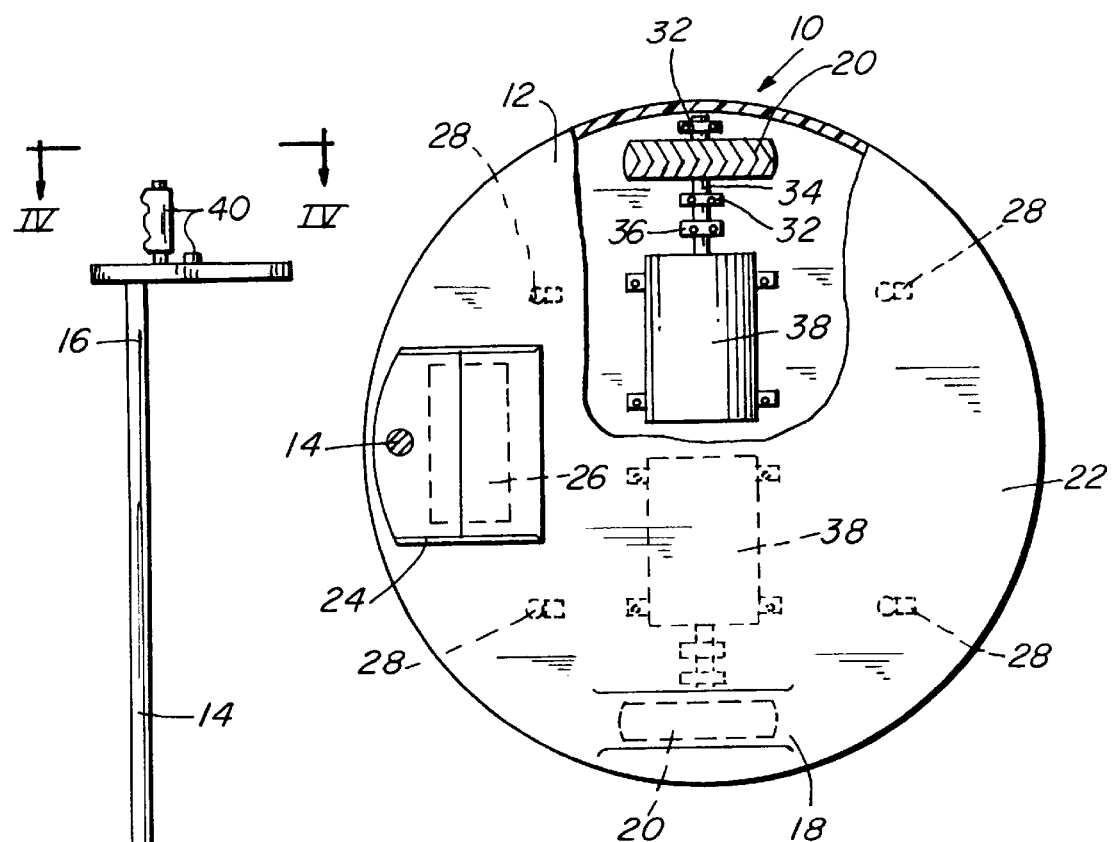
FIG. 2 is a top plan view of the apparatus platform, partially broken away, taken on line II—II of FIG. 1.

As noted, the apparatus includes power driven wheels, specifically a pair of powered wheels 20 located beneath the respective fenders 18. Powered wheels 20 are mounted to platform 12, for example by means of bearings 32 which rotatably retain the axle 34 of a wheel 20. To provide additional support for platform 12, a plurality of castering, non-powered wheels 28 are mounted to the underside of platform 12. The castering wheels 28 are disposed at mutually spaced locations and generally symmetrically with respect to the center C of platform 12, as shown in FIG. 2. The spacing of wheels 28 from one another and from center C will be as great as necessary to provide suitable stability for the apparatus 10.

All wheels 20 and 28 include conventional tread portions which contact the surface supporting apparatus 10, a floor 30 for example, in a common plane. Any suitable, known articulated suspension for the powered and non-powered wheels 20 and 28 may be employed to equalize loading among the various wheels.

A drive coupling 36 connects each drive wheel 20 with a drive motor 38, also mounted to the underside of platform 12. The drive motors 38 preferably are identical d.c. motors powered by battery 26 through manipulation of controls 40 on assembly 16.

The platform 12 is circular in plan view about a center C. The driven wheels 20 are symmetrically located with their axes of rotation on a common axis passing through center C of the platform 12. Actuation of the controls, as described hereinbelow, to drive wheels 20 at equal rotary speed in opposite rotary directions will rotate the apparatus 10 about center C without any lateral translation in any direction. Accordingly, the platform 12 is able to turn completely around within its own circular profile, which means it can be turned completely around in any space into which it can be maneuvered.

With motors 38 mounted to the underside of platform 12 as shown in FIG. 2, limitations arise as to how low the standing surface 22 of platform 12 can be located with respect to floor 30. Preferably, and especially for disabled persons, the step up from floor 30 to platform area 22 should be as small as possible. In addition, the lower the standing surface 22 can be made, the greater the stability of the apparatus overall.

FIG. 3 shows an alternative drive arrangement for the apparatus 10 which allows the elevation of surface 22 above floor 30 to be reduced to an absolute minimum. Drive motors 38 in FIG. 3 are positioned inwardly and forwardly of wheels 20, and provide driving impetus to the wheels 20 through a conventional angle drive 41 such as a known bevel gear or worm gear drive. With this configuration, platform 12 can be lowered substantially with respect to the drive elements including motors 38 and wheels 20. This may well require enlargement of fender portions 18, and provision of similar upwardly projecting enclosures to receive and house the portions of motors 38 projecting above the plane of surface 22. With the motors 38 removed from the central underside area of platform 12 as shown in FIG. 3, the elevation of standing area 22 above floor 30 may be reduced to an absolute minimum.

The control assembly 16 (FIG. 4) comprises a generally semi-circular handle bar 42 with a cross bar 44 extending between and rigidly fixed to opposed sides thereof. This handle bar assembly is mounted on support 14 in a position such that at no point does it extend outside of the circular profile of platform 12. Within the confines of the space between handle bar elements 42 and 44 is mounted a control console 46 which is configured to leave an open space 48 between itself and cross bar element 44 so that the cross bar 44 may be grasped by the user if desired.

The controls included on control console 46 and collectively identified hereinabove by the numeral 40 include a joystick 50, a battery charge indicator, for example an LED indicator 52, a selectively adjustable maximum speed governor 54, rotation or turning controls 56 and 58, a brake 60, and a key lock switch 62. As a guard against inadvertent operation, joystick 50 includes a pushbutton 51 which must be depressed and held in order to allow the joystick to be operative.

In operation, a user mounts the apparatus by stepping up onto surface 22, preferably from the rear 21 of apparatus 10. The user takes a position generally centrally on platform 12 and steadies himself by grasping the handle bar elements 42 and/or 44. Key lock switch 62 must be turned on to enable the power systems of the apparatus to provide powered movement thereof. At all times during operation, indicator 52 will indicate the status of the battery charge, and of course the battery must be recharged periodically in the conventional manner as use of the apparatus drains the battery charge.

The preset speed governor 54, a rotary switch for example, is to be set to ensure the apparatus will not exceed a safe speed.

All powered movements of the apparatus, including translation and rotation, rely on drive wheels 20 and the respective d.c. drive motors 38. By depressing button 51 and tilting joystick 50 forwardly as indicated by arrow F in FIG. 4, the apparatus is powered in forward translation. Similar joystick movement to the rear as indicated by arrow B produces backward translation.

If both wheels 20 are driven to translate the apparatus 10 in a forward direction, then slowing of either the left or right drive motor 38 will cause the apparatus to steer to the left or right, respectively. Thus, by tilting the joystick 50 to the right during forward translation as indicated by arrow R, the power delivered to the right drive motor 38 is reduced and that motor, and the corresponding drive wheel 20, will slow down with respect to the other motor 38 and wheel 20. The apparatus 10 thus steers to the right. Moving the joystick to the left during forward translation, as indicated by arrow L, similarly causes the apparatus 10 to steer to the left. Similarly, moving the joystick to the rear and simultaneously tilting it to the left or right while translating backward will steer the apparatus to the left or right, as above described for forward translation.

The apparatus speed and turn rate may be controlled by the degree of joystick movement, with smaller control movements commanding lower speed and/or turn rate and larger movements commanding higher speed and/or turn rate.

When one is translating in one direction, forward for example, moving the joystick to an opposed orientation will also provide a braking effect, commonly known as dynamic braking, wherein the momentum of the apparatus causes the wheels 20 to drive the drive motors, rather than the motors driving the wheels. The motors therefore act as generators, and thus they resist being driven since energy must be expended to recharge the battery 26. Accordingly, in dynamic braking the momentum of the apparatus is entirely dissipated in driving the drive motors against their resistance to being driven.

For pure rotation without translation, as required to turn the apparatus 10 around, wheels 20 must be rotated in opposite directions at the same speed. Accordingly, left and right rotation control buttons 56 and 58, spring loaded pushbuttons for example, are provided. Pushing and holding button 56 causes wheels 20 to be driven at equal speed in opposite directions to rotate the apparatus 10 around center C in a counterclockwise direction. Pushing button 58 similarly rotates the apparatus 10 in a clockwise direction. Since the platform 12 is circular and rotates about its center C in these rotation operation, it turns completely within its own profile and therefore can turn completely around in any space it occupies.

Finally, brake bar 60, upon being depressed, locks up both drive motors 38 thus stopping the motors and the driven wheels 20. This preferably may be achieved by supplying the positive voltage of battery 26 to both sides of the armature coils of both motors 38, thus locking the armatures of both motors. An alternative structure for brake 60 may be a brake control configured with respect to the handle bar element 42 and/or 44 such that one holds the emergency brake bar 60 in its disengaged position at all times during operation of the apparatus 10. Thus, whenever the user releases brake bar 60, the emergency brake will automatically engage.

The electronic circuitry needed to provide the described control functions is believed to be well known in the art from numerous prior patents, among other sources. For example, the circuitry for one such control system is disclosed in the above cited U.S. Pat. No. 4,475,611, the pertinent disclosure of which is now incorporated herein and made a part thereof by reference.

According to the above description, there is provided by the instant invention a novel and improved personal transportation apparatus. Notwithstanding the description hereinabove of the presently preferred best mode of my invention, I have contemplated various alternative and modified embodiments, and certainly such would also occur to others versed in the art, once they were apprised of my invention. Accordingly, it is my intention that the invention should be construed broadly and limited only by the scope of the claims appended hereto.

I claim:

1. A personal transportation apparatus comprising:
   a platform adapted to be supported with respect to a floor surface;
   said platform having a circular profile defining substantially the entire laterally outer periphery thereof, and an upper surface adapted to accommodate a standing user thereon;

a plurality of wheels mounted on said platform for supporting said platform with respect to such a floor surface, said pluality of wheels including a pair of power driven wheels located a laterally spaced locations and a plurality of non-powered wheels;

a power source for driving said power driven wheels independently of each other;

an upstanding control console fixed to said platform and including control means for acuating said power source to selectively drive said power driven wheels;

said power source being operable by actuation of said controls means to drive said pair of power driven wheels for moving said apparatus in translation and rotation on such on such a floor surface; and said power driven wheels being positioned with respect to said circular profile of said platform such that, upon driving said power driven wheels at equal speed in opposite rotary directions, said platform turns solely in rotation about the center of said circular profile, without translation of said center of said circular profile.

2. The personal transportation apparatus as set forth in claim 1 wherein said control console includes handle bar means adapted to be grasped by such a standing user.

3. The personal transportation apparatus as set forth in claim 1 wherein said power source includes a pair of d.c. motors for independently driving said pair of power driven wheels, respectively.

4. The personal transportation apparatus as set forth in claim 3 wherein said power source further includes a battery for supplying power to said pair of d.c. motors.

5. The personal transportation apparatus as set forth in claim 3 wherein said control console includes a joystick control for actuating said pair of d.c. motors.

6. The personal transportation apparatus as set forth in claim 5 wherein said joystick is selectively movable forward and backward to power said power driven wheels for driving said apparatus in forward or backward translation, respectively, at a speed which is variable by varying the magnitude of said forward or backward movement of said joystick control.

7. The personal transportation apparatus as set forth in claim 6 wherein said joystick control is selectively movable, simultaneously with said movement thereof forward or backward, to power said power driven wheels for driving said apparatus in forward or backward translation with simultaneous left or right turning, respectively.

8. The personal transportation apparatus as set forth in claim 1 wherein said control console includes a pair of selectively operable controls, each for powering said power driven wheels in a manner to rotate said platform in only one selected rotary direction of rotation about the center of said circular profile without translation of said circular profile.

* * * * *